United States Patent
Da Costa et al.

(10) Patent No.: US 12,530,483 B1
(45) Date of Patent: Jan. 20, 2026

(54) SYSTEMS AND METHODS FOR AUTOMATICALLY AND DYNAMICALLY GENERATING A CROSS-CHANNEL IDENTIFIER FOR DISPARATE DATA IN AN ELECTRONIC NETWORK

(71) Applicant: BANK OF AMERICA CORPORATION, Charlotte, NC (US)

(72) Inventors: Vinicius Mouffron Ribas Da Costa, Charlotte, NC (US); Michael R. Young, Davidson, NC (US); Mark A. Odiorne, Waxhaw, NC (US); Jinna Kim, Charlotte, NC (US); Kelly Renee-Drop Keiter, Waxhaw, NC (US); Lauran Adele Hollar, Conover, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 8 days.

(21) Appl. No.: 18/779,960

(22) Filed: Jul. 22, 2024

(51) Int. Cl.
*G06F 21/62* (2013.01)
*G06F 21/54* (2013.01)
*G06F 17/15* (2006.01)

(52) U.S. Cl.
CPC ........ *G06F 21/6218* (2013.01); *G06F 21/54* (2013.01); *G06F 17/15* (2013.01)

(58) Field of Classification Search
CPC ....... G06F 21/6218; G06F 21/54; G06F 17/15
See application file for complete search history.

(56) References Cited

U.S. PATENT DOCUMENTS

| | | | |
|---|---|---|---|
| 11,272,011 B1 * | 3/2022 | Laughton | G06N 3/08 |
| 11,550,813 B2 * | 1/2023 | Kabra | G06F 16/951 |
| 11,927,925 B2 * | 3/2024 | Drees | H04L 41/16 |
| 12,008,472 B2 * | 6/2024 | Cook | H04L 9/3263 |

* cited by examiner

*Primary Examiner* — Han Yang
(74) *Attorney, Agent, or Firm* — Moore & Van Allen PLLC; Lauren M. Stokes

(57) ABSTRACT

Systems, computer program products, and methods are described herein for automatically and dynamically generating a cross-channel identifier for disparate data in an electronic network. The present invention is configured to identify a first data point generated at a first instance and from a first data source; identify a second data point generated at a second instance and from a second data source; correlate, by a large language model, the first data point with the second data point; generate, based on the correlation, a shared identifier for the first data point and the second data point; identify a current data point at a current instance; verify, by the large language model, the current data point is consistent with the first data point and the second data point; and apply, based on the verification of the current data point, the shared identifier to the current data point.

20 Claims, 8 Drawing Sheets

SYSTEMS AND METHODS FOR AUTOMATICALLY AND DYNAMICALLY GENERATING A CROSS-CHANNEL IDENTIFIER FOR DISPARATE DATA IN AN ELECTRONIC NETWORK

FIELD OF THE INVENTION

The present invention embraces a system for automatically and dynamically generating a cross-channel identifier for disparate data in an electronic network.

BACKGROUND

Issues often arise when many databases and other such storage components are generated from different sources and systems and identifying whether the different data is generated by the same source at different data sources, databases, devices, networks, and/or the like. Further, and based on this issue, correlating such data within these different systems can be difficult as different identifiers are used in different systems. Thus, there exists a need for a system that can automatically, dynamically, and in real time generate cross-channel identifiers for disparate data in an electronic network.

Applicant has identified a number of deficiencies and problems associated with identifying data between disparate sources and disparate formats. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for automatically and dynamically generating a cross-channel identifier for disparate data in an electronic network is provided. In some embodiments, the system may comprise: a memory device with computer-readable program code stored thereon; at least one processing device operatively coupled to the at least one memory device and the at least one communication device, wherein executing the computer-readable code is configured to cause the at least one processing device to: identify a first data point generated at a first instance and from a first data source; identify a second data point generated at a second instance and from a second data source; correlate, by a large language model, the first data point with the second data point; generate, based on the correlation, a shared identifier for the first data point and the second data point; identify a current data point at a current instance; verify, by the large language model, the current data point is consistent with the first data point and the second data point; and apply, based on the verification of the current data point, the shared identifier to the current data point.

In some embodiments, the first data source is associated with a first database and wherein the second data source is associated with a second database.

In some embodiments, the at least one of the first data point, the second data point, or the current data point comprises at least one of a telemetry data or a log data.

In some embodiments, the first data point comprises a different structure, a different identifier, or at least one different attribute from the second data point.

In some embodiments, executing the computer-readable code is further configured to cause the at least one processing device to: generate, by a generative artificial intelligence (AI) engine, a confidence score for the shared identifier, wherein the confidence score is based on the correlation between the current data point with the first data point and the second data point; identify a confidence threshold associated with the shared identifier; and compare the confidence score with the confidence threshold. In some embodiments, executing the computer-readable code is further configured to cause the at least one processing device to: apply, based on the confidence score meeting or exceeding the confidence threshold, the current data point to the shared identifier.

In some embodiments, executing the computer-readable code is further configured to cause the at least one processing device to: un-correlate, based on the confidence score being less than the confidence threshold, the current data point with the first data point and the second data point. In some embodiments, executing the computer-readable code is further configured to cause the at least one processing device to: automatically transmit, based on the confidence score being less than the confidence threshold, the current data point to a feedback artificial intelligence (AI) engine, wherein the feedback AI engine comprises a feedback loop connected with the generative AI engine; and verify, by the feedback AI engine, the confidence score of the current data point with the first data point and the second data point. In some embodiments, executing the computer-readable code is further configured to cause the at least one processing device to: identify a current user session associated with the current data point; and automatically block, based on the confidence score being less than the confidence threshold, the current user session. In some embodiments, executing the computer-readable code is further configured to cause the at least one processing device to: identify a current user session associated with the current data point; and correlate, based on the confidence score being less than the confidence threshold, the current data point with a potential secondary shared identifier, wherein the current data point correlates with at least one secondary data point of the secondary shared identifier.

In some embodiments, the shared identifier is associated with a shared user.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
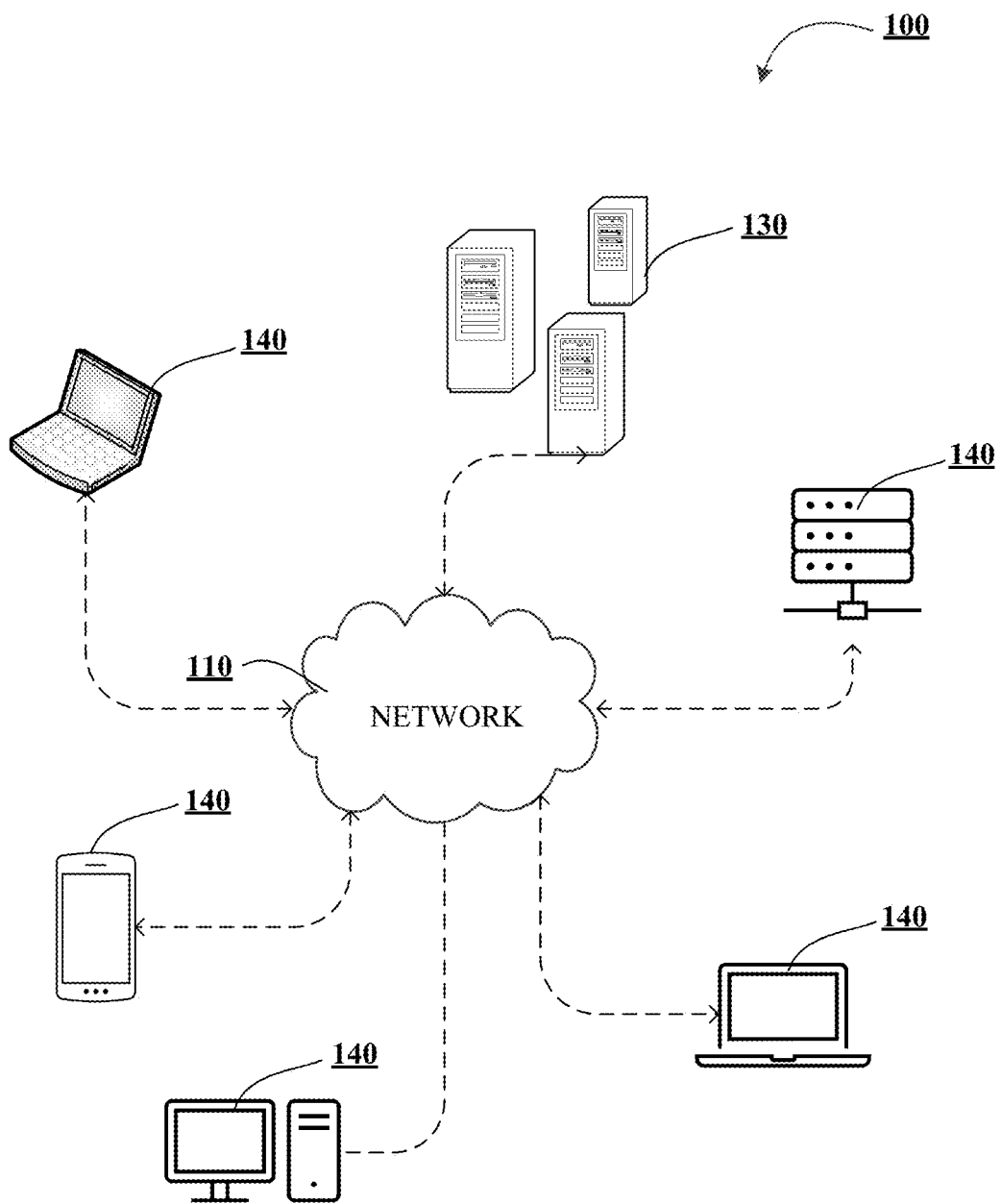
Figure 1B:
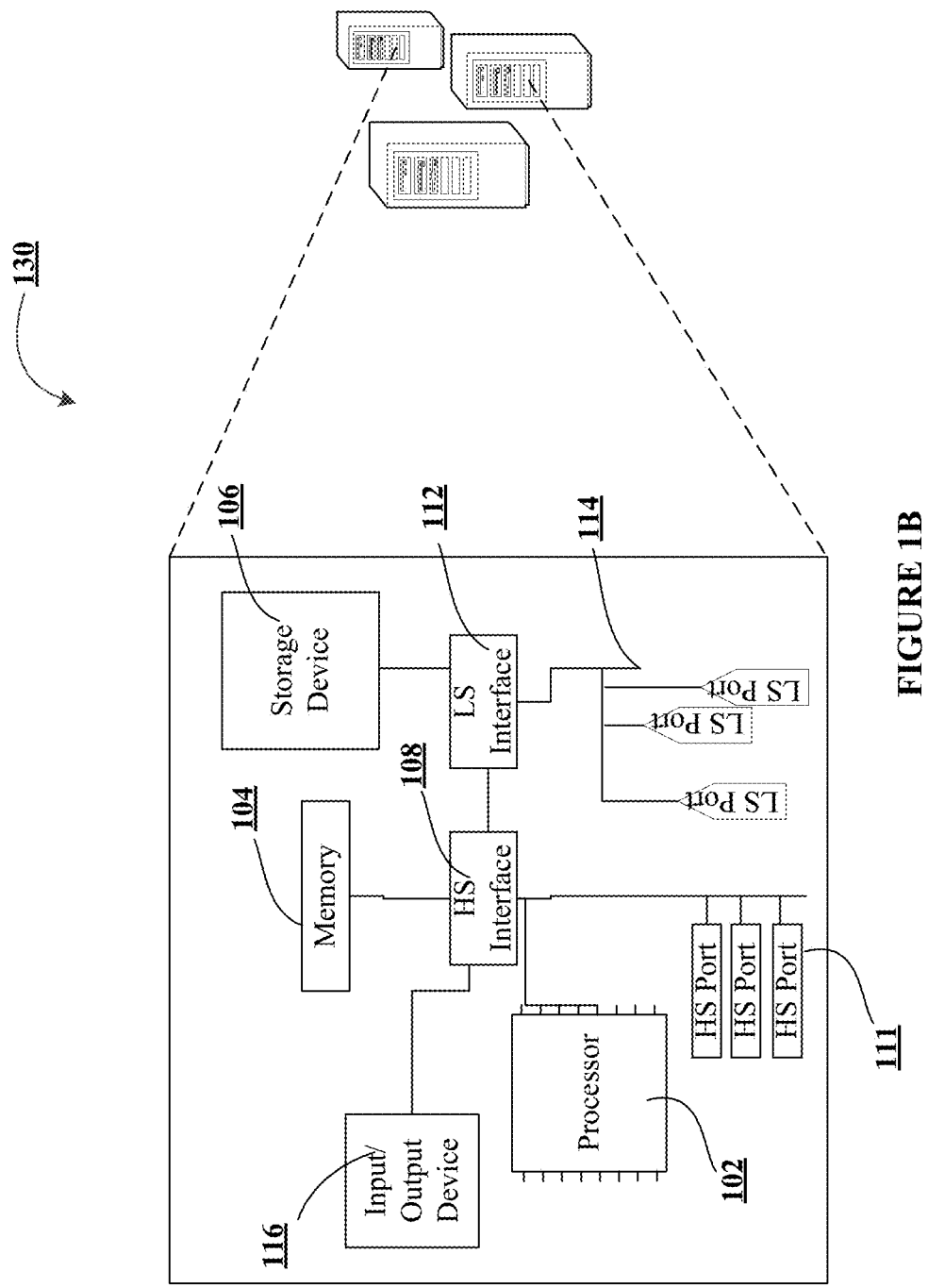
Figure 1C:
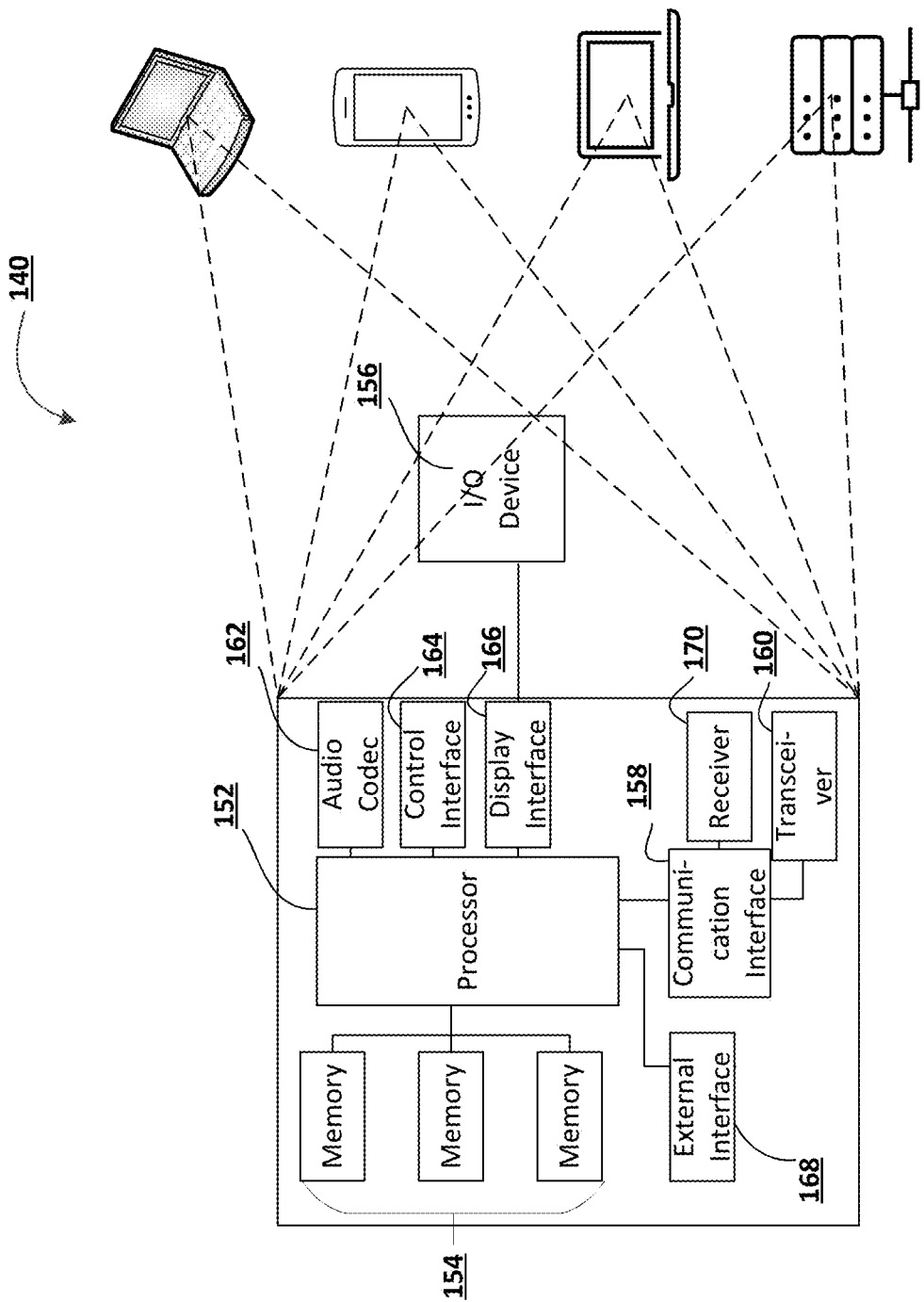
Figure 2:
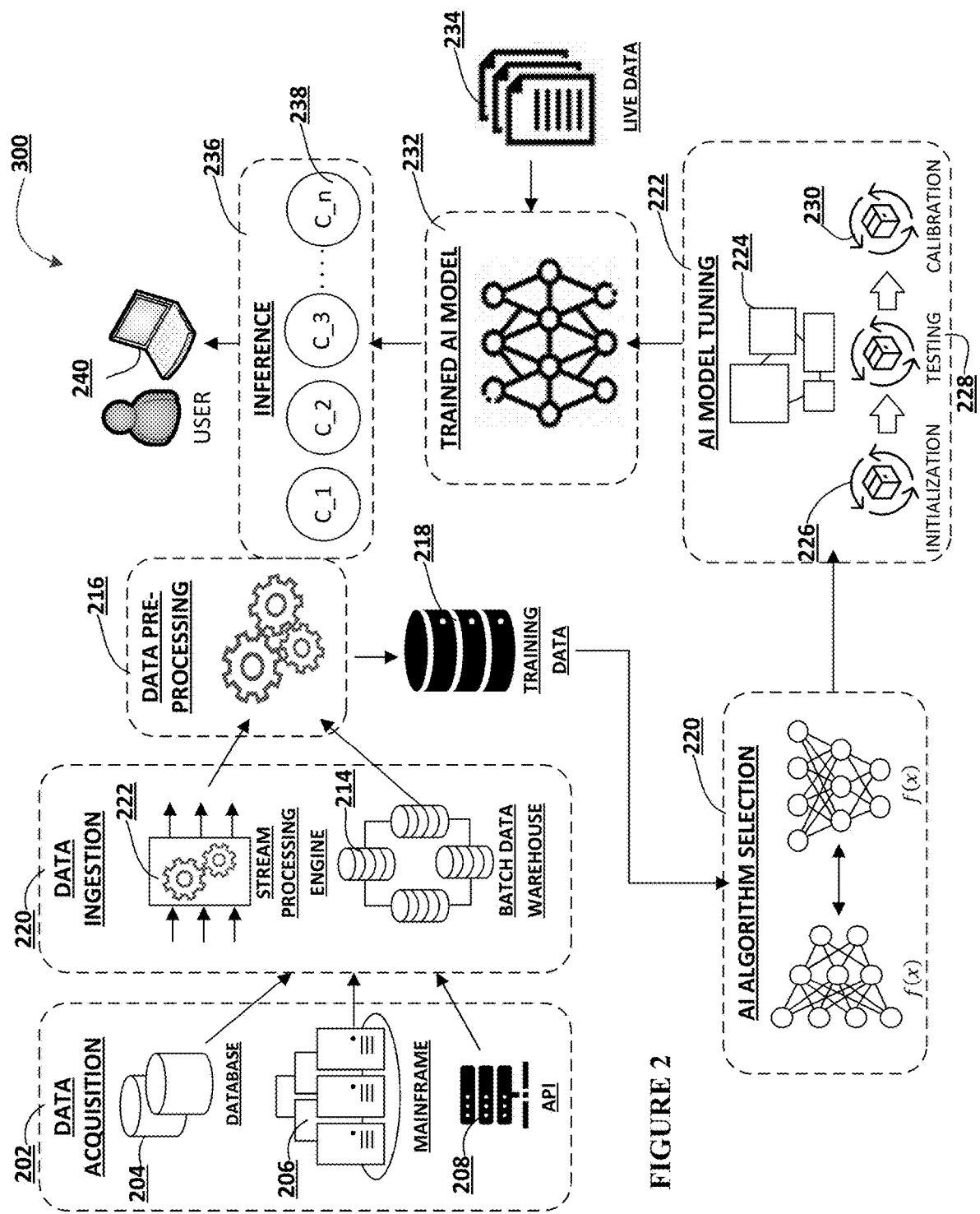
Figure 3:
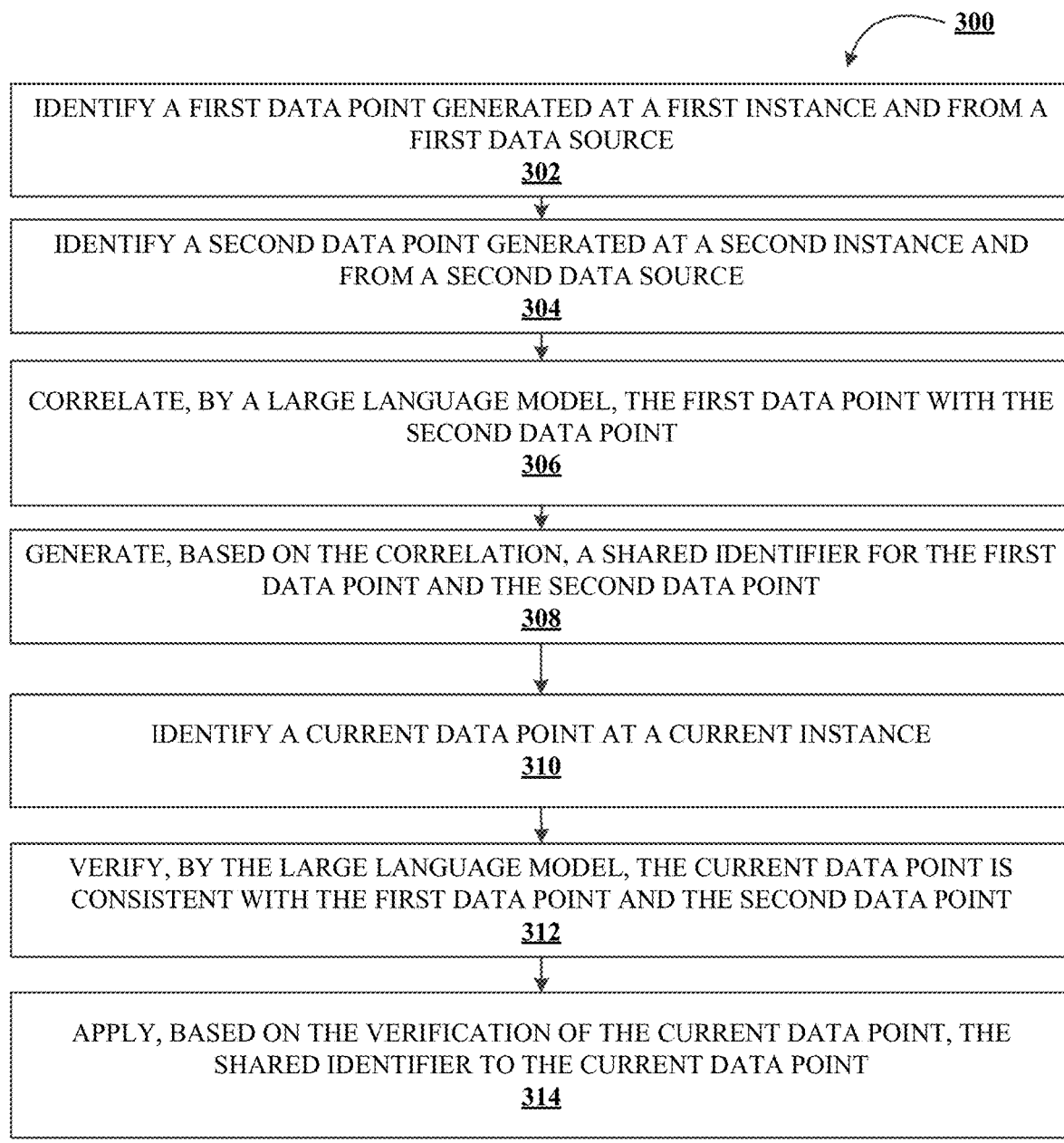
Figure 4:
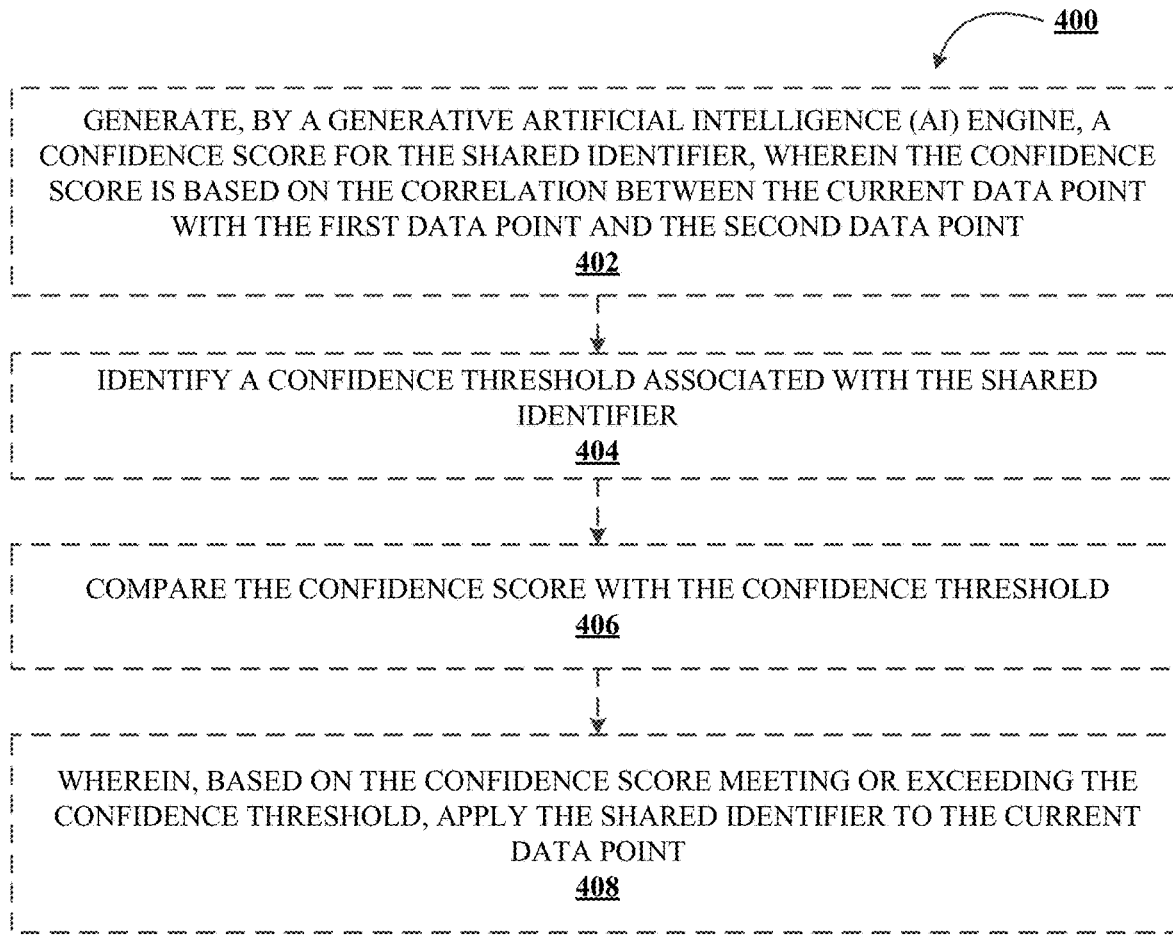
Figure 5:
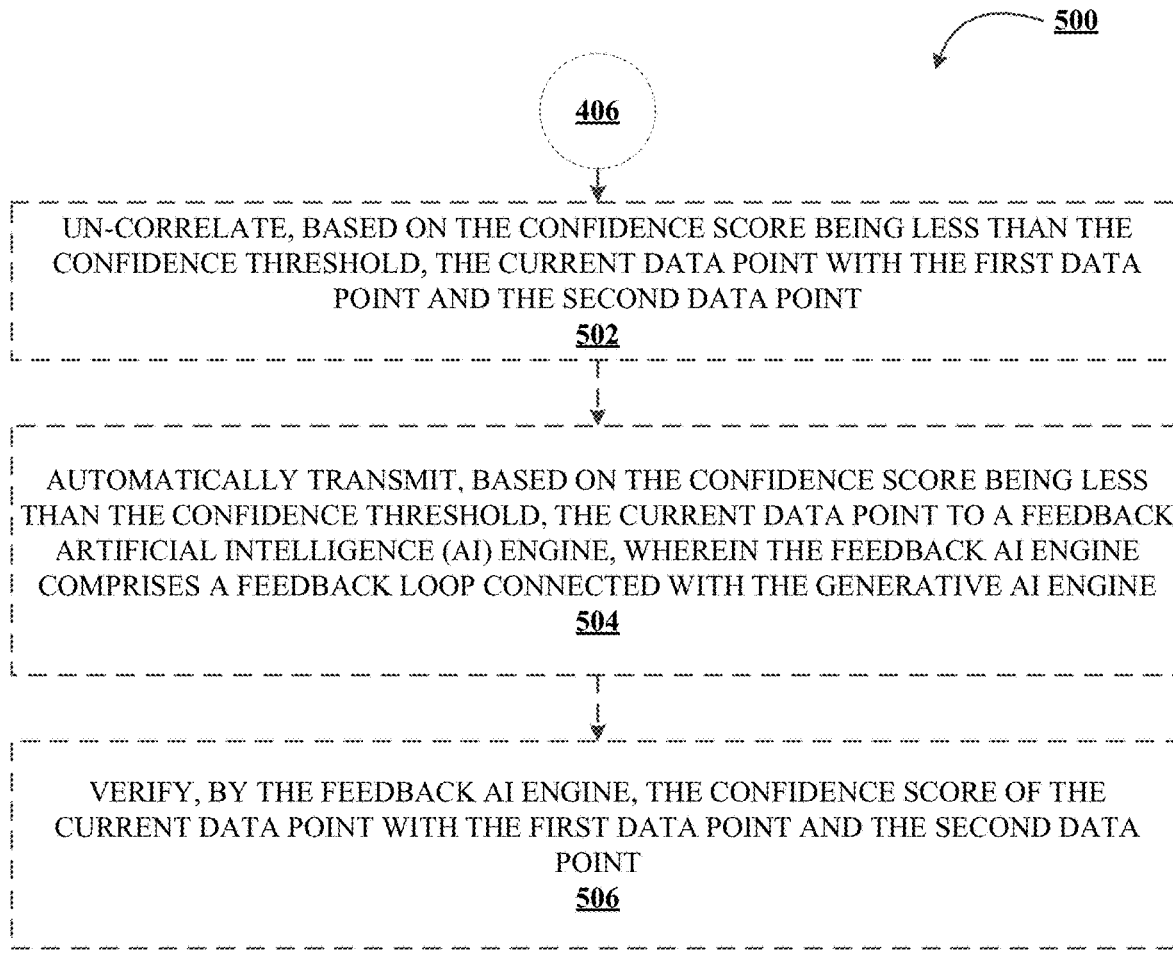
Figure 6:
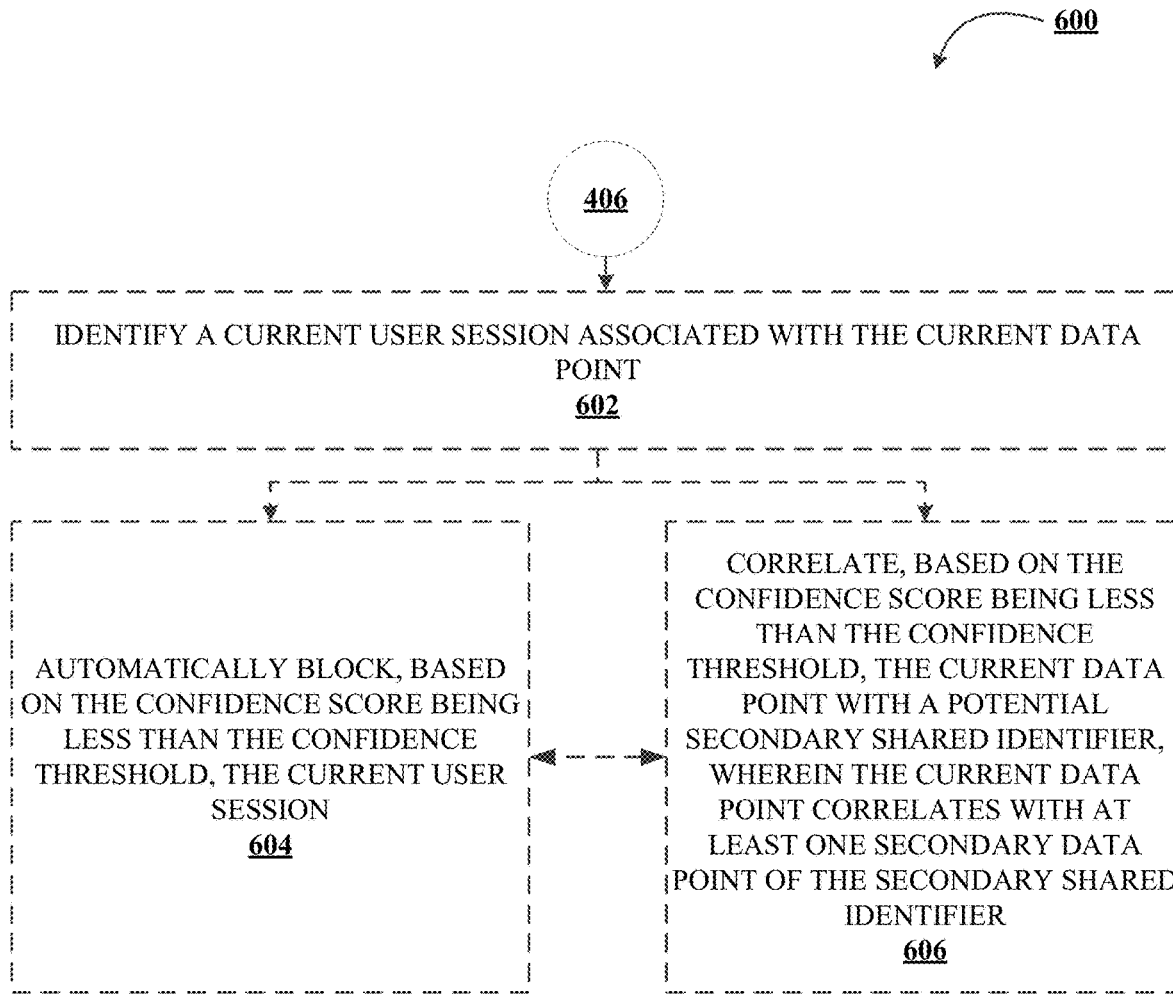

Having thus described embodiments of the invention in general terms, reference will now be made the accompanying drawings, wherein:

FIGS. 1A-1C illustrates technical components of an exemplary distributed computing environment for automatically and dynamically generating a cross-channel identifier for disparate data in an electronic network, in accordance with an embodiment of the disclosure;

FIG. 2 illustrates an exemplary artificial intelligence (AI) engine subsystem architecture, in accordance with an embodiment of the disclosure;

FIG. 3 illustrates a process flow for automatically and dynamically generating a cross-channel identifier for disparate data in an electronic network, in accordance with an embodiment of the disclosure;

FIG. 4 illustrates a process flow for comparing the confidence score with the confidence threshold to apply the shared identifier to the current data point, in accordance with an embodiment of the disclosure;

FIG. 5 illustrates a process flow for verifying the confidence score of the current data point, in accordance with an embodiment of the disclosure; and FIG. 6 illustrates a process flow for identifying a current user session associated with the current data point and automatically blocking the user session and/or correlating the current data point with a secondary shared identifier, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Issues often arise when many databases and other such storage components are generated from different sources and systems and identifying whether the different data is generated by the same source (e.g., a same user, entity, and/or the like) at different data sources, databases, devices, networks, and/or the like. Further, and based on this issue, correlating such data within these different systems can be difficult as different identifiers are used in different systems. Thus, there exists a need for a system that can automatically, dynamically, and in real time generate cross-channel identifiers for disparate data in an electronic network.

Accordingly, the present disclosure provides the identification of a first data point generated at a first instance and from a first data source; the identification of a second data point generated at a second instance and from a second data source; the correlation, by a large language model, of the first data point with the second data point; and the generation, based on the correlation, of a shared identifier for the first data point and the second data point. Further, the disclosure provides for the identification of a current data point at a current instance; the verification, by the large language model, of the current data point is consistent with the first data point and the second data point; and the application, based on the verification of the current data point, of the shared identifier to the current data point.

In other words, the disclosure provides a system for generating a cross-channel identifier which may be used to correlate data from disparate sources with a single identifier. In some embodiments, the invention may provide a trained large language model to correlate the data across the multiple data sources. Once the data is correlated, the system may then verify whether, in real time or near real time, newly received data associated with the single identifier is consistent or inconsistent with the historical disparate data. Additionally, and in some embodiments, the system itself (such as through a generative AI component) may generate a confidence score of whether the data should be correlated together and tagged with the same identifier (e.g., indicating the same source or entity generated the data). Such a confidence score may be used as a threshold for threat detection for when the real time data is inconsistent with the historical data (e.g., the use of a system is inconsistent with past or historical use, and/or the like). In some embodiments, and upon determining the confidence score is below the threshold, the system may automatically transmit the data to another AI component which is set within a feedback loop and is configured to perform its own analysis on whether the previous determination of inconsistency is correct.

What is more, the present invention provides a technical solution to a technical problem. As described herein, the technical problem includes identifying data between disparate sources and disparate formats. The technical solution presented herein allows for the automatic, dynamic, and real time generation and/or application of single identifiers for disparate data. In particular, the disclosure is an improvement over existing solutions to identifying disparate data, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

Further, the receipt, correlation, and enhancement of distributed and disparate data as described herein enables load distribution by allowing data to be stored at individual data sources in a distributed manner. Previous systems require that all applicable information is hosted at one central location, which requires massive databases and increases network traffic as data continuously flows from each data source to the central server. In contrast, the distributed storage described herein reduces network congestion while still allowing the data to be accessible as needed to achieve the features and functions of the system. Thus, and by generating and applying single, shared identifier across disparate data from different data sources, the disclosure provided herein allows for a linking between disparate data stored at different and distributed storage locations, allowing for reduced network congestion and greater accessibility to data associated with each shared identifier no matter their storage formats, languages, formats, tables/databases, and/or the like.

FIGS. 1A-1C illustrate technical components of an exemplary distributed computing environment for automatically and dynamically generating a cross-channel identifier for disparate data in an electronic network 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary artificial intelligence (AI) engine subsystem architecture 200, in accordance with an embodiment of the disclosure. The artificial intelligence subsystem 200 may include a data acquisition engine 202, data ingestion engine 210, data pre-processing engine 216, AI engine tuning engine 222, and inference engine 236. Additionally, and as used herein, the AI engine subsystem architecture described and shown herein may be used to further describe and show the technical components and training of a generative AI engine. Further, and in some embodiments, the disclosure provided herein for the technical components of this AI engine may additionally be used as a base for a large language model (LLM) which may be trained on large sets of data (such as the data described herein for the subsystem architecture 200 and/or the data described herein with respect to FIGS. 3-6). Thus, such an LLM may be configured—using the AI engine—to recognize and generate text, and other such natural language processing tasks (e.g., classification, context, and/or the like).

The data acquisition engine 202 may identify various internal and/or external data sources to generate, test, and/or integrate new features for training the artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence engine 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 218 may require further enrichment. For example, in supervised learning, the training data is enriched using one or more meaningful and informative labels to provide context so a artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained artificial intelligence engine 232, similar to any other software application output, can be persisted to storage, file, memory, or application, or looped back into the processing component to be reprocessed. More often, the trained artificial intelligence engine 232 is deployed into an existing production environment to make practical business decisions based on live data 234. To this end, the artificial intelligence subsystem 200 uses the inference engine 236 to make such decisions. The type of decision-making may depend upon the type of artificial intelligence algorithm used. For example, artificial intelligence engines trained using supervised learning algorithms may be used to structure computations in terms of categorized outputs (e.g., $C\_1$, $C\_2$ . . . . $C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., $C\_1$, $C\_2$ . . . . $C\_n$ 238) live data 234 based on how similar they are to one another to solve exploratory challenges where little is known about the data, provide a description or label (e.g., $C\_1$, $C\_2$ . . . . $C\_n$ 238) to live data 234, such as in classification, and/or the like. These categorized outputs, groups (clusters), or labels are then presented to the user input system 130. In still other cases, artificial intelligence engines that perform regression techniques may use live data 234 to predict or forecast continuous outcomes.

It will be understood that the embodiment of the artificial intelligence subsystem 200 illustrated in FIG. 2 is exemplary and that other embodiments may vary. As another example, in some embodiments, the artificial intelligence subsystem 200 may include more, fewer, or different components.

FIG. 3 illustrates a process flow 300 for automatically and dynamically generating a cross-channel identifier for disparate data in an electronic network, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300. In some embodiments, an artificial intelligence engine and/or a generative AI engine (e.g., such as the AI engine shown in FIG. 2), and/or a large language model (e.g., such as that described in FIG. 2) may perform some or all of the steps described in process flow 300.

As shown in block 302, the process flow 300 may include the step of identifying a first data point generated at a first instance and from a first data source. For example, and as used herein, a data point refers to a single piece of data, such as a variable indicating a user input, a keystroke from a user device, an application access, an application event, a timestamp of input/keystroke/access/event, and/or the like. Thus, and in some embodiments, the system may identify a single piece of data as a first data point received at a first instance (e.g., a historical instance or time), which may have been received from a user device and stored on a database, a table, within a dataset, and/or the like, at a first data source. In this manner, the first data point and its associated data points (in an instance where the first data point is part of a first dataset from a user device session), then the first dataset may be stored at a first data source (e.g., a first database, a first table, a first hard drive, a first solid state drive, a first network, a first file, and/or the like).

In some embodiments, the system may identify a plurality of data points (such as a plurality of data points that were generated and recorded from a single user session, and may use this plurality of data points as the first data point, the second data point, the current data point, and/or the like). Thus, and in such embodiments, the system may analyze each data point within each plurality of data points for each of the first data point, the second data point, the current data point, each data point's attributes, and/or the like, in completing the process described herein with respect to FIGS. 3-6.

Thus, and in some embodiments, the first instance described herein with respect to the first data point refers to a historical and/or previous time which the first data point was received and/or generated. For instance, and when a piece of data is generated or recorded at a user device, the first instance may comprise the time and date which the piece of data was generated or recorded at the user device.

In some embodiments, the system may identify the first data point based on accessing the storage component where the first data point is stored, such as accessing a database, table, dataset, and/or the like, and continuously analyzing each data point stored in the storage component for matching to a pre-existing shared identifier (e.g., where the data point corresponds to data point(s) of the pre-existing shared identifier) and/or generating a shared identifier (e.g., where the data point does not correspond to any data points that already have a shared identifier). Thus, and in some embodiments, the system may be tasked with generated and/or applying a shared identifier to each data point already stored initially (e.g., before analyzing a current data point) and/or applying a shared identifier to each data point already stored continuously and in parallel to analyzing current data points. Such current data points and their analysis for a shared identifier are discussed in further detail herein.

As shown in block 304, the process flow 300 may include the step of identifying a second data point generated at a second instance and from a second data source. For example, the system may identify a second data point in a similar manner to the identification of the first data point (e.g., accessing a storage component such as a database, table, dataset, and/or the like), whereby the second data point may be identified at a historical or previous time to receiving and/or identifying a current data point. For example, the system may continuously analyze each data point stored in each storage component that is associated with the system's network (such as a client's network of computing devices and storage devices which the system needs to analyze to generate shared identifiers), stored in the system's network, and/or the like. Additionally, and as used herein the term "second instance" may refer to the time and/or data at which the second data point was generated and/or recorded. In some instances, the second instance may occur after the first instance. However, and as understood by someone of skill in the art, the first instance and the second instance may not be limiting as being generated and/or recorded in sequential order based on the terms "first" and "second," and instead may only be used for explanatory and clarification purposes to indicate that the data points are disparate and separate from each other. Thus, the disclosure provided herein is not limited to instances of a first data point, second data point, but instead may comprise third data point(s), fourth data point(s), fifth data point(s), and so on until each data point within a network, storage component, and from each data source have been stored with an identifier/shared identifier.

Thus, and with respect to the reference of a first data source and a second data source, the terms "first" and "second" as used herein is not intended to be limiting based on time with which the data points are generated, recorded, and/or accessed by the system, but instead are meant for clarification purposes to distinguish the data sources from each other. However, and in some embodiments, such a first data source and a second data source may refer to the same data source that comprise multiple data points (e.g., the first data point, second data point, and/or the like), such as a same user device, a database, and/or the like, where each data point comprises its own attribute(s). Thus, and in some embodiments, the first data source may be associated with a first database and the second data source may be associated with a second database. For instance, and in some embodiments, the data sources described herein may comprise their own unique identifiers (e.g., an EID number, and/or the like), unique locations within a storage component, table identifier, log identifier, file identifier and/or file address, and/or the like.

Thus, and in some embodiments, the second data point may comprise the same or similar attributes to the first data point, whereby the term "attribute" refers to the characteristics, variables, numerical values, properties, telemetry data, and/or the like, used to describe the context and information of the data point. For example, a data point may comprise an access event of an application, and the attribute(s) of the data point may comprise a description or information regarding a timestamp for accessing the application, telemetry data, log data, the application name and/or identifier, whether physical characters were used to login or access the application (e.g., facial recognition to login to an application's user account), a network used for accessing the application, the geolocation of the user device at the time of the access event, the events or inputs received within the application after application access, and/or the like.

In some embodiments, and based on analyzing the each of these data points (e.g., the first data point, the second data point, and/or the like), and in some embodiments, their attributes, the system may determine whether each of the data points were generated by a same source, such as the same user, same entity, and/or the like. Thus, and in some embodiments, where the data points are similar or the same according to some or all of the attributes, the system may determine that the same user has generated both data points and a shared identifier should be generated and/or applied to both data points for easy and efficient identification of all the data points associated with the user across disparate systems, applications, networks, devices, storage components, and/or the like.

In contrast to the example provided above, and in some embodiments where the system cannot determine that the first data point and the second data point comprise the same or similar attributes (indicating the same source), then the system may determine that the first data point and the second data point should not comprise a shared identifier. Thus, the system may instead need to use two different shared identifiers with other data points (which may either be pre-generated and applied to these data points, individually, and/or may be generated in real time for these data points, individually).

Thus, and as described herein, such data points from these disparate sources, from disparate applications generating the data points, and/or the like, may comprise different structures, formats, user identifiers, attributes, attribute identifiers/classifications/topics, and/or the like, from other data points. For example, the first data point may comprise its own structure that is different and disparate from the structure of the second data point. Thus, and in order to analyze the data and attributes within each data point (despite each data point's format, structure, attributes, and/or the like) the system may rely on a large language model to analyze each piece of data and attributes to determine correlations between each data point and determine whether shared identifiers should be applied or generated between data points.

As shown in block 306, the process flow 300 may include the step of correlating, by a large language model (LLM), the first data point with the second data point. For example, the system may correlate the first data point with the second data point based on the underlying data (e.g., attributes) of each data point, which may describe the pattern of the source of the data (e.g., where the source may refer to the user that generated the data point based on user input at a user device). Thus, and using the LLM—which may be pre-trained on vast amounts of user input patterns, user access patterns, user event patterns, and/or the like—the system may correlate the first data point with the second data point to compare the underlying data (attribute(s)) of the data points to determine whether the data points have been generated by the same source. For instance, the LLM may be configured to break up each attribute and its data, analyze and compare each same type of attribute between the data points, and determine whether the underlying data for each attribute is the same or very/substantially similar. As used herein, the term "substantially similar" may refer to a determination that most (e.g., more than 75% as an example) of the attributes for both data points are the same (such as the same geolocation where the data point was generated, the same keystrokes, the same keystroke speed, the same keystroke pattern, the same access events, the same events within an application, and/or the like).

In an embodiment where the data for each attribute of the first data point and the second data point are the same or substantially similar, then the system—using the LLM—may correlate the first data point and the second data point, indicating that the first data point and the second data point likely come from the same source (e.g., user).

In some embodiments, the correlation of the first data point and the second data point may be based on a knowledge graph organizing the data points from the multiple and disparate sources by capturing the data points themselves and their associated data and information, and forging or generating nodes and connections between each node associated with each data point. In this manner, the knowledge graph(s) may filter out data that is not necessary to make each connection and prevent clumping of data and information erroneously (e.g., by discovering errors in the data, discover data that may not be of a threshold quality, and filter data that has already been saved in the knowledge graph). Further, and in an instance where a knowledge graph (or a plurality of knowledge graphs are used), the system may use shared vocabularies, patterns, standards, formats, languages, and/or the like to correlate the disparate data between the sources, which may further allow for a more refined and accurate correlation between like data points that may appear, on their face, unalike (e.g., based on dissimilar formatting, patterns, standards, types, languages, and/or the like). Additionally, and importantly, such a generation and use of knowledge graphs may improve computing searching and capabilities by storing less data (such as by not storing data of bad quality, erroneous data, copies of the same data, un-important data, and/or the like), and thus, may allow for quicker response times, lower network resource consumption, and greater accuracy in correlating the data points such that manual intervention may be avoided or lessened significantly. Such knowledge graphs may be used as a solution to neural network and artificial intelligence hallucinations and efficiency problems.

As shown in block 308, the process flow 300 may include the step of generating, based on the correlation, a shared identifier for the first data point and the second data point. For example, the system may—based on the correlation between the first data point and the second data point—generate a shared identifier for the first data point and the second data point, which may be used to indicate that the first data point and the second data point are from the same source, even if they were generated or stored at disparate data sources (e.g., user devices, databases, files, networks, and/or the like). Additionally, and/or alternatively, in an instance where the first data point and the second data point are correlated (have the same or substantially similar underlying data/attributes to a historical data point that has its own shared identifier already generated and stored), then the system may apply same shared identifier as the historical data point to the first data point and the second data point.

As used herein, the shared identifier refers to unique string of characters (such as alphanumeric characters), which uniquely identifies the source (a shared user) of each data point. In some embodiments, the shared identifier may comprise an additional string of characters that are specific to each data source where each data point is stored, which may additionally be applied to the data point with the shared identifier. In this manner, and in some embodiments where an entity, user, and/or the like, needs to access or search for particular data points at particular data sources, then the system may efficiently and in near real time access the data points at each storage component, individually.

As shown in block 310, the process flow 300 may include the step of identifying a current data point at a current instance. For example, the system may identify a current data point as a data point that was generated and/or recorded at a current or present time. Thus, and in such embodiments, the system may identify the current data point in real time or near real time to its generation at the user device and/or recordation at its data source. In some embodiments, the current data point generation and/or recordation may trigger the system to automatically analyze the current data point and its underlying data as soon as possible (in real time or near real time). In some embodiments, the data source of the current data point may comprise a new/different data source (a current data source) from the first data source and/or second data source, or the current data source may be the same data source as the first data source and/or the second data source.

As shown in block 312, the process flow 300 may include the step of verifying, by the large language model, the current data point is consistent with the first data point and the second data point. For example, the system may verify—using the LLM—that the current data point is consistent with the first data point and the second data point based on analyzing the underlying data of the current data point with the data point(s) of the shared identifier, which in this case comprises the first data point and the second data point. Thus, and based on a determination that the underlying data (attribute(s)) of the current data point are the same or substantially similar to the attribute(s) of the data point(s) of the shared identifier, the system may then verify that the current data point is consistent with the data point(s) of the shared identifier. In some embodiments, and where the attribute(s) of the current data point are not substantially similar or the same as the attributes of the data points for the shared identifier, then the system may conduct the same verification process with each pre-generated shared identifier known to the system until a shared identifier is verified for the current data point.

As shown in block 314, the process flow 300 may include the step applying, based on the verification of the current data point, the shard identifier to the current data point. For example, the system may apply the shared identifier to the current data point when the current data point has been verified with a shared identifier's data points, wherein the application of the shared identifier to the current data point may comprise a storage of the shard identifier with the data point (the current data point) at the current data source.

FIG. 4 illustrates a process flow 400 for comparing the confidence score with the confidence threshold to apply the shared identifier to the current data point, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process flow 400. In some embodiments, an artificial intelligence engine and/or a generative AI engine (e.g., such as the AI engine shown in FIG. 2), and/or a large language model (e.g., such as that described in FIG. 2) may perform some or all of the steps described in process flow 400.

In some embodiments, and as shown in block 402, the process flow 400 may include the step of generating, by a generative artificial intelligence (AI) engine, a confidence score for the shared identifier, wherein the confidence score is based on the correlation between the current data point with the first data point and the second data point. For example, and in some embodiments, the system may generate—using a generative AI engine (such as the one disclosed above with respect to FIG. 2)—a confidence score for the shared identifier, whereby the confidence score quantifies the correlation between the data points associated with a shared identifier, such that the confidence score may indicate a likelihood that the data points of the shared identifier should or should not be correlated with the same shared identifier.

Thus, the system may generate a confidence score, by a trained generative AI engine, which is trained and configured to analyze the underlying data of each data point, the surrounding data for each data point (such as where a data point is recorded from a user session, the generative AI engine may analyze all the data points in the user session as the current data point (or the first data point, the second data point, and/or the like, depending on whether the data points have already been analyzed and whether a shared identifier has been applied to the data point(s)).

Such a generative AI engine may be pre-trained to analyze each data point's attribute(s), the differences and similarities between each data point's attribute(s) as compared to the other data point's attributes (e.g., the differences between the attributes of the current data point and the attributes of the first data point and/or the second data point, and/or the like), to determine whether the current data point is actually consistent with the first data point and the second data point (and/or other data points associated with the shared identifier).

Such a confidence score may comprise a numerical value, a letter indicator, and/or the like, which indicates the likelihood or unlikelihood that the current data point was accurately determined as consistent with the data point(s) of the shared identifier. Further, and in some embodiments, the confidence score may be based on a matching of the patterns between the attributes of the current data point and the data point(s) of the shared identifier (e.g., patterns of keystrokes, patterns of geographic identifiers for generating the data point, clicking and/or keystroke speed, access event patterns, authentication credential patterns, physical characteristics, telemetry data, user device identifiers used, and/or the like).

In some embodiments, and as shown in block 404, the process flow 400 may include the step of identifying a confidence threshold associated with the shared identifier. For example, and in some embodiments, the system may identify a confidence threshold by receiving the confidence threshold from a manager of the system, from a client of the system, and/or by the system generating its own confidence threshold (e.g., using AI and/or generative AI and historical feedback for when the generative AI engine has been correct and incorrect). Thus, and in such embodiments, the confidence threshold may indicate a level at which the determination that the current data point is consistent with the data point(s) of the shared identifier can be trusted (and may not need human intervention to correct the wrong shared identifier application to the current data point).

In some embodiments, the confidence threshold may be associated with all the shared identifiers associated with a client of the system, associated with a client's network(s), a client's storage component(s), and/or the like. Additionally, and/or alternatively, each shared identifier may be associated with their own, particular confidence threshold, which may be based on the level of security of the data points of the shared identifier (e.g., whereby the greater the level of security needed for the data point(s) of the shared identifier, the greater the confidence threshold may be, or the lower the security needed for the data point(s) of the shared identifier, the lower the confidence threshold may be).

In some embodiments, and as shown in block 406, the process flow 400 may include the step of comparing the confidence score with the confidence threshold. For example, the system may compare the confidence score with the confidence threshold, whereby the term "compare" refers to an analysis or equation of between the confidence score and the confidence threshold for the shared identifier. Thus, and in an instance where the confidence score meets or exceeds the confidence threshold, then the system may allow the application of the shared identifier to the current data point as it has been verified that the current data point is consistent with the previously verified data point(s) of the shared identifier. Additionally, and/or alternatively, where the confidence score does not meet or exceed the confidence threshold, then the system may block the application of the shared identifier to the current data point, and the system may repeat the processes herein described to generate and/or apply another shared identifier that does comprise data point(s) that correspond to the current data point. Additionally, and/or alternatively, in an instance where the confidence score does not meet or exceed the confidence threshold, then the process described herein may continue to the process described below with respect to FIGS. 5 and 6.

In some embodiments, and as shown in block 408, the process flow 400 may include the step of applying, based on the confidence score meeting or exceeding the confidence threshold, the shared identifier to the current data point. For instance, and as described briefly above, the system may apply—based on the confidence score meeting or exceeding the confidence threshold—the shared identifier to the current data point, such that the shared identifier may be stored with the current data point at its data source, storage component, and/or the like.

FIG. 5 illustrates a process flow 500 for verifying the confidence score of the current data point, in accordance with an embodiment of the disclosure. In some embodiments, a system (e.g., similar to one or more of the systems described herein with respect to FIGS. 1A-1C) may perform one or more of the steps of process flow 500. For example, a system (e.g., the system 130 described herein with respect to FIG. 1A-1C) may perform the steps of process 500. In some embodiments, an artificial intelligence engine and/or a generative AI engine (e.g., such as the AI engine shown in FIG. 2), and/or a large language model (e.g., such as that described in FIG. 2) may perform some or all of the steps described in process flow 500.

In some embodiments, and as shown in block 502, the process flow 500 may include the step of un-correlating, based on the confidence score being less than the confidence threshold, the current data point with the first data point and the second data point. For instance, the system may un-correlate (or in an instance where the current data point has not already been correlated to the first data point and the second data point, block the correlation of the current data point to the first data point and the second data point), the current data point from the data points of the shared identifier when the current data point's confidence score for the shared identifier is below the confidence threshold, thus indicating a low likelihood that the current data point should be correlated with the data point(s) of the shared identifier.

In some embodiments, such an un-correlation of the current data point from the shared identifier may comprise the deletion of the shared identifier from storage with the current data point in its current data source and/or current database/table/file/and/or the like, and/or a deletion of the shared identifier from the current data point's data. In some embodiments, the un-correlation of the shared identifier from the current data point may comprise a blocking of the application of the shared identifier to the current data point before the shared identifier is stored and/or associated with the current data point.

In some embodiments, and as shown in block 504, the process flow 500 may include the step of automatically transmitting, based on the confidence score being less than the confidence threshold, the current data point to a feedback artificial intelligence (AI) engine, wherein the feedback AI engine comprises a feedback loop connected with the generative AI engine. For instance, the system may automatically transmit—based on the confidence score not meeting the confidence threshold—the current data point to a feedback AI engine, whereby the feedback AI engine may be trained and configured to act within a feedback loop to determine how accurate the generative AI engine is performing in determining whether the current data point correlates or corresponds to the data point(s) of the shared identifier. Thus, and in this manner, the feedback AI engine may be trained and configured on its own, separate from the generative AI engine, to make its own determinations of whether the current data point matches or substantially matches the data point(s) of the shared identifier. Therefore, and in this manner, an extra layer of determination and accuracy may be involved for checking itself, within the system described herein, to determine whether the determination of a current data point and its data point(s) is (are) accurate based on its own training and analysis.

In some embodiments, and as shown in block 506, the process flow 500 may include the step of verifying, by the feedback AI engine, the confidence score of the current data point with the first data point and the second data point. For instance, the system may verify the confidence score that may have been previously generated in FIG. 4 to verify whether the confidence score was accurate/correct for the current data point as compared to the other data points of the shared identifier (that is currently stored with the current data point). Thus, and in such embodiments, the system may verify the confidence score based on the separate analysis of the feedback AI engine, whereby the feedback AI engine may be pre-trained on similar data to the generative AI engine and data of feedback from human intervention (e.g., client user(s) which may indicate whether or not the shared identifier(s) have been correct in past or historical instances, how these determinations for correctness were determined, and/or the like). Thus, and in some embodiments, each of the large language model (LLM), generative AI engine, feedback AI engine, and/or the like, are each trained on their own pieces of data, and may only be called upon for use in an instance where they are necessary to make the determination of the shared identifier, the confidence score, and the confidence score verification, respectively. Thus, each of the LLM, generative AI engine, and the feedback AI engine may be trained on their own sets of data without overburdening any of these component with unnecessary data for their training.

FIG. 6 illustrates a process flow 600 for identifying a current user session associated with the current data point and automatically blocking the user session and/or correlating the current data point with a secondary shared identifier, in accordance with an embodiment of the disclosure. In some embodiments, a system (e.g., similar to one or more of the systems described herein with respect to FIGS. 1A-1C) may perform one or more of the steps of process flow 600. For example, a system (e.g., the system 130 described herein with respect to FIG. 1A-1C) may perform the steps of process 600. In some embodiments, an artificial intelligence engine and/or a generative AI engine (e.g., such as the AI engine shown in FIG. 2), and/or a large language model (e.g., such as that described in FIG. 2) may perform some or all of the steps described in process flow 600.

In some embodiments, and as shown in block 602, the process flow 600 may include the step of identifying a current user session associated with the current data point. For instance, the system may identify a current user session as the user session at the user device associated with the current data point, whereby the current user session may be book-ended (e.g., started) by an authentication by the user at the user device (such as a passcode entry, a facial recognition entry, a first user input by the user after a screen lock and/or a sleep mode of the user device) and a sleep mode and/or lock mode of the user device after the user session has ended, and/or a logout period after a user input has not been received at the user device and/or an application on the user device (e.g., ended). Thus, and in some such embodiments, the user session may comprise a plurality of data points within the user session, a singular data point within the user session, and/or the like, whereby the data point(s) may indicate an event at the user device during a user session.

In some embodiments, and as shown in block 604, the process flow 600 may include the step of automatically blocking, based on the confidence score being less than the confidence threshold, the current user session. For instance, the system may automatically block the current user session in real time or near real time to the confidence score determination based on identifying that the current user session is not a part of a trusted user account, which may be based itself on determining that the current data point cannot be associated with a shared identifier of a known user. For example, and where a current data point was previously believed (by the system described herein) as being shared with a known user via its shared identifier, then the system may determine that the current data point is not confidently associated with the user (e.g., by determining that the current data point does not correspond to the data point(s) of the shared identifier), and then the system may determine that another actor or using is acting in the guise of and/or in place of a trusted user, and thus, should be automatically blocked from further user interactions and inputs.

In some embodiments, and as shown in block 606, the process flow 600 may include the step of correlating, based on the confidence score being less than the confidence threshold, the current data point with a potential secondary shared identifier, wherein the current data point correlates with at least one secondary data point of the secondary shared identifier. For example, the system may correlate the current data point with a potential secondary shared identifier (such as a second shared identifier that the system has determined better matches the data points for the second shared identifier) in an instance where the first or original shared identifier is determined as unverified. Thus, and in such an embodiment, the system may continuously and/or intermittently analyze shared identifiers for matching to a current data point until an applicable shared identifier is chosen and verified (e.g., based on the data point(s) associated with the verified shared identifier and their matching to the current data point data).

As understood by a person of skill in the art, the processes described herein are not meant to be mutually exclusive or exhaustive of the potential processes that may occur. Thus, and by way of example, the processes described herein with respect to blocks 604 and 606 are not intended to be mutually exclusive options, but may occur in the same case and/or in different cases for the instances described herein.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Further-more, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for automatically and dynamically generating a cross-channel identifier for disparate data in an electronic network, the system comprising:
    a memory device with computer-readable program code stored thereon;
    at least one processing device operatively coupled to the at least one memory device and the at least one communication device, wherein executing the computer-readable code is configured to cause the at least one processing device to:
    identify a first data point generated at a first instance and from a first data source;
    identify a second data point generated at a second instance and from a second data source;
    correlate, by a large language model, the first data point with the second data point;
    generate, based on the correlation, a shared identifier for the first data point and the second data point;
    identify a current data point at a current instance;
    verify, by the large language model, the current data point is consistent with the first data point and the second data point; and
    apply, based on the verification of the current data point, the shared identifier to the current data point.

2. The system of claim 1, wherein the first data source is associated with a first database and wherein the second data source is associated with a second database.

3. The system of claim 1, wherein the at least one of the first data point, the second data point, or the current data point comprises at least one of a telemetry data or a log data.

4. The system of claim 1, wherein the first data point comprises a different structure, a different identifier, or at least one different attribute from the second data point.

5. The system of claim 1, wherein executing the computer-readable code is further configured to cause the at least one processing device to:
    generate, by a generative artificial intelligence (AI) engine, a confidence score for the shared identifier, wherein the confidence score is based on the correlation between the current data point with the first data point and the second data point;
    identify a confidence threshold associated with the shared identifier; and
    compare the confidence score with the confidence threshold.

6. The system of claim 5, wherein executing the computer-readable code is further configured to cause the at least one processing device to:
    apply, based on the confidence score meeting or exceeding the confidence threshold, the shared identifier to the current data point.

7. The system of claim 5, wherein executing the computer-readable code is further configured to cause the at least one processing device to:
    un-correlate, based on the confidence score being less than the confidence threshold, the current data point with the first data point and the second data point.

8. The system of claim 7, wherein executing the computer-readable code is further configured to cause the at least one processing device to:
    automatically transmit, based on the confidence score being less than the confidence threshold, the current data point to a feedback artificial intelligence (AI) engine, wherein the feedback AI engine comprises a feedback loop connected with the generative AI engine; and
    verify, by the feedback AI engine, the confidence score of the current data point with the first data point and the second data point.

9. The system of claim 7, wherein executing the computer-readable code is further configured to cause the at least one processing device to:
    identify a current user session associated with the current data point; and
    automatically block, based on the confidence score being less than the confidence threshold, the current user session.

10. The system of claim 7, wherein executing the computer-readable code is further configured to cause the at least one processing device to:
    identify a current user session associated with the current data point; and
    correlate, based on the confidence score being less than the confidence threshold, the current data point with a potential secondary shared identifier, wherein the current data point correlates with at least one secondary data point of the secondary shared identifier.

11. The system of claim 1, wherein the shared identifier is associated with a shared user.

12. A computer program product for automatically and dynamically generating a cross-channel identifier for disparate data in an electronic network, the computer program product comprising a non-transitory computer-readable medium comprising code causing an apparatus to:
    identify a first data point generated at a first instance and from a first data source;
    identify a second data point generated at a second instance and from a second data source;
    correlate, by a large language model, the first data point with the second data point;
    generate, based on the correlation, a shared identifier for the first data point and the second data point;
    identify a current data point at a current instance;

verify, by the large language model, the current data point is consistent with the first data point and the second data point; and apply, based on the verification of the current data point, the shared identifier to the current data point.

13. The computer program product of claim 12, wherein the first data source is associated with a first database and wherein the second data source is associated with a second database.

14. The computer program product of claim 12, wherein the at least one of the first data point, the second data point, or the current data point comprises at least one of a telemetry data or a log data.

15. The computer program product of claim 12, wherein the first data point comprises a different structure, a different identifier, or at least one different attribute from the second data point.

16. The computer program product of claim 12, wherein the shared identifier is associated with a shared user.

17. A computer implemented method for automatically and dynamically generating a cross-channel identifier for disparate data in an electronic network, the computer implemented method comprising:

identifying a first data point generated at a first instance and from a first data source;

identifying a second data point generated at a second instance and from a second data source;

correlating, by a large language model, the first data point with the second data point;

generating, based on the correlation, a shared identifier for the first data point and the second data point;

identifying a current data point at a current instance;

verifying, by the large language model, the current data point is consistent with the first data point and the second data point; and applying, based on the verification of the current data point, the shared identifier to the current data point.

18. The computer implemented method of claim 17, wherein the first data source is associated with a first database and wherein the second data source is associated with a second database.

19. The computer implemented method of claim 17, wherein the at least one of the first data point, the second data point, or the current data point comprises at least one of a telemetry data or a log data.

20. The computer implemented method of claim 17, wherein the first data point comprises a different structure, a different identifier, or at least one different attribute from the second data point.

\* \* \* \* \*